Feb. 20, 1923.
G. R. LAWRENCE.
HYDROCARBON CONSUMING HEATING APPARATUS.
FILED MAR. 29, 1920.
1,445,965.
8 SHEETS—SHEET 2.
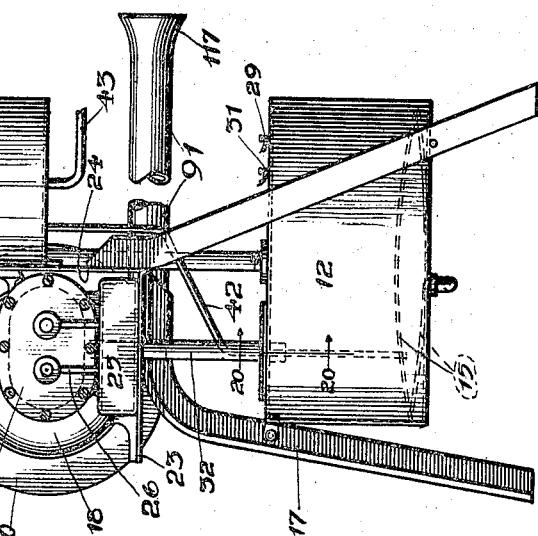
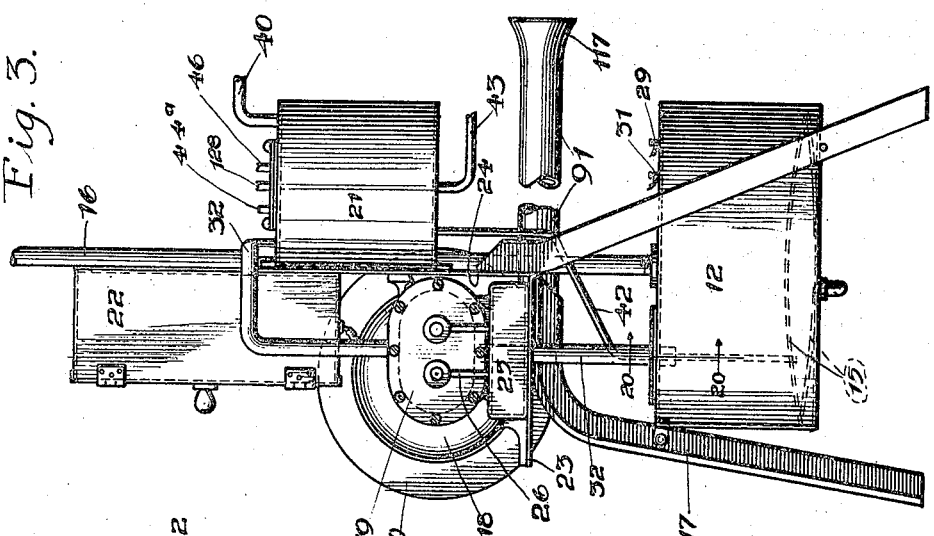
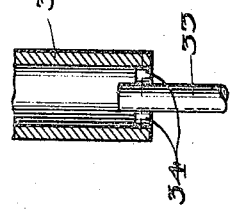
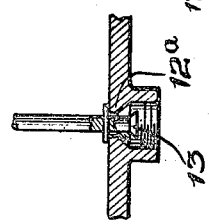
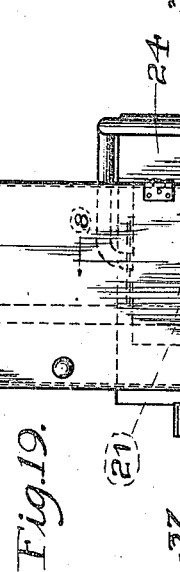
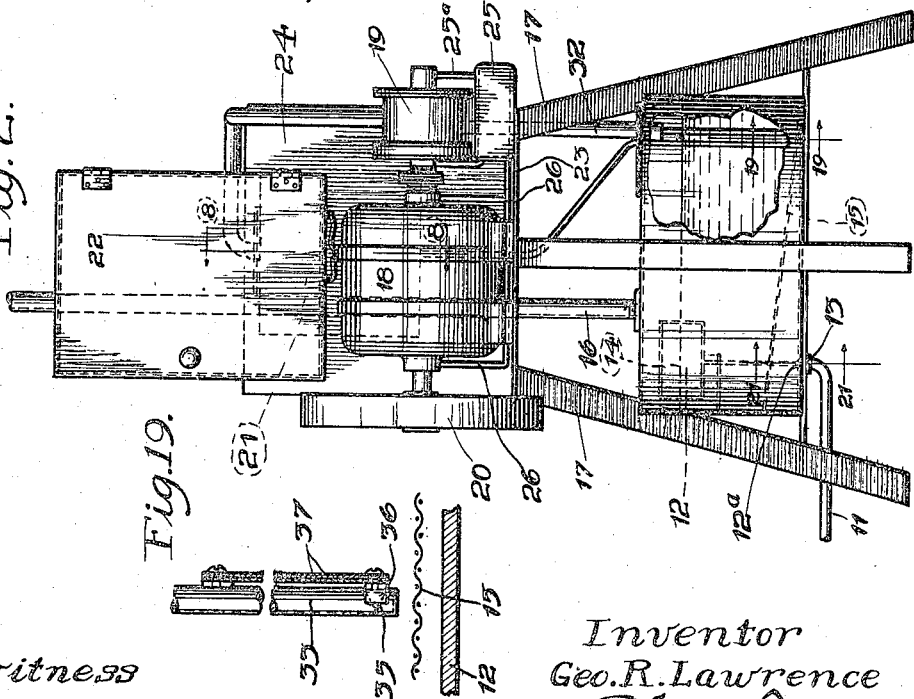
Inventor
Geo. R. Lawrence Feb. 20, 1923.
G. R. LAWRENCE.
HYDROCARBON CONSUMING HEATING APPARATUS.
FILED MAR. 29, 1920.
1,445,965.
8 SHEETS—SHEET 3.
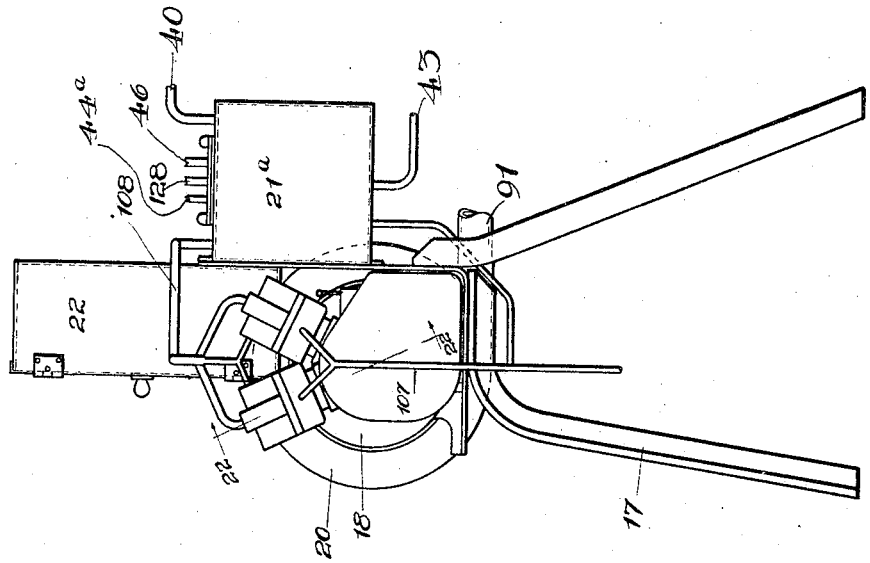
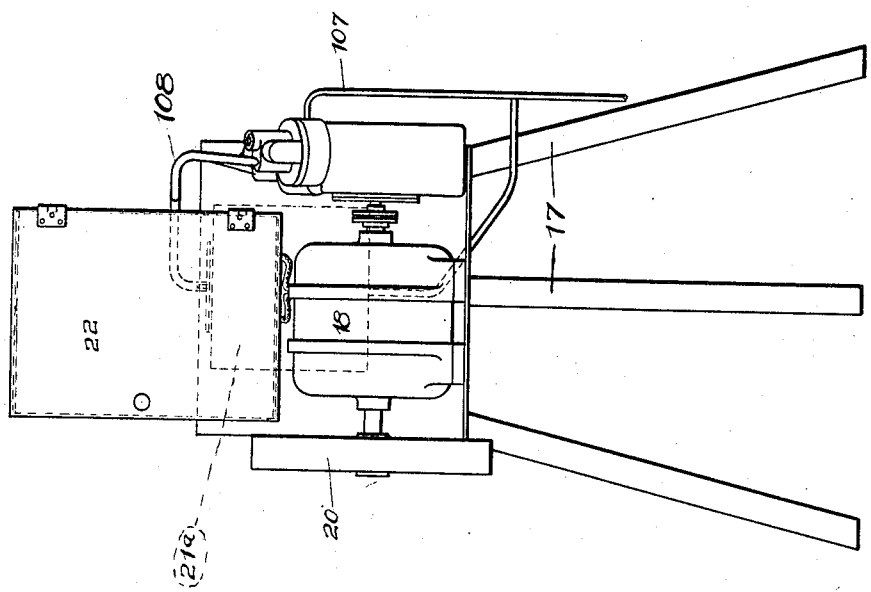
Witness
Geo R Lawrence
Inventr
Geo. R. Lawrence
By Chas. C. Tillman
Atty.

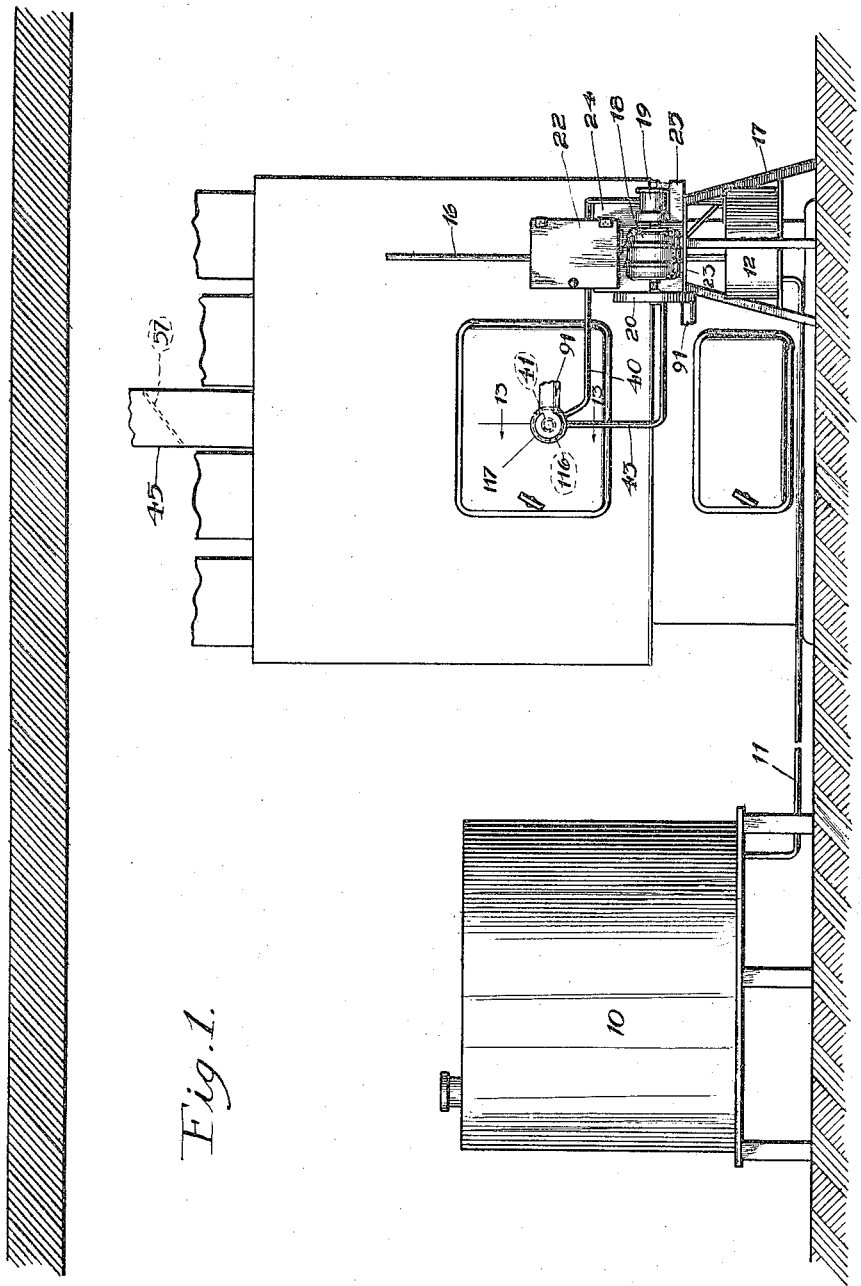

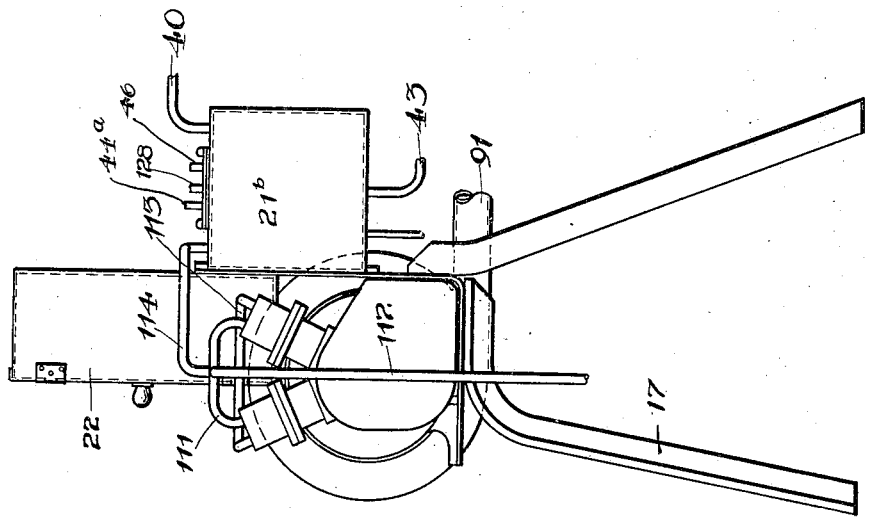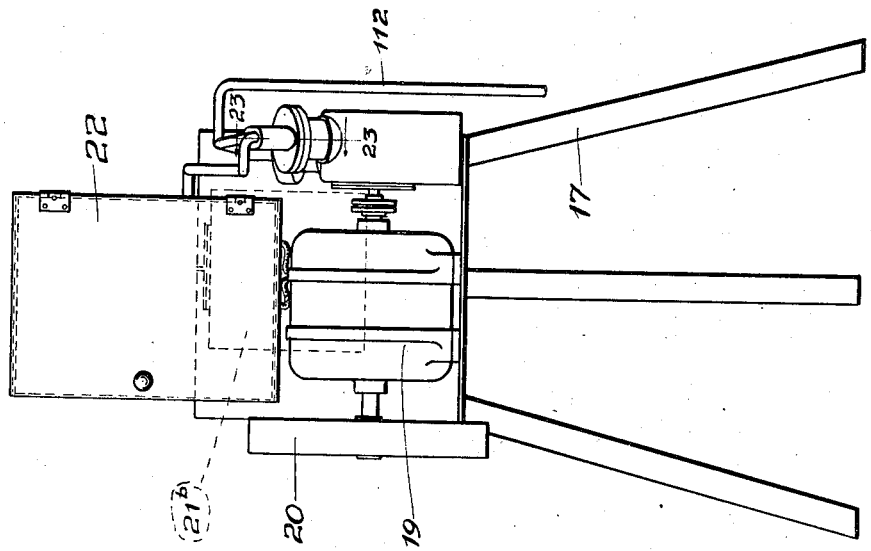

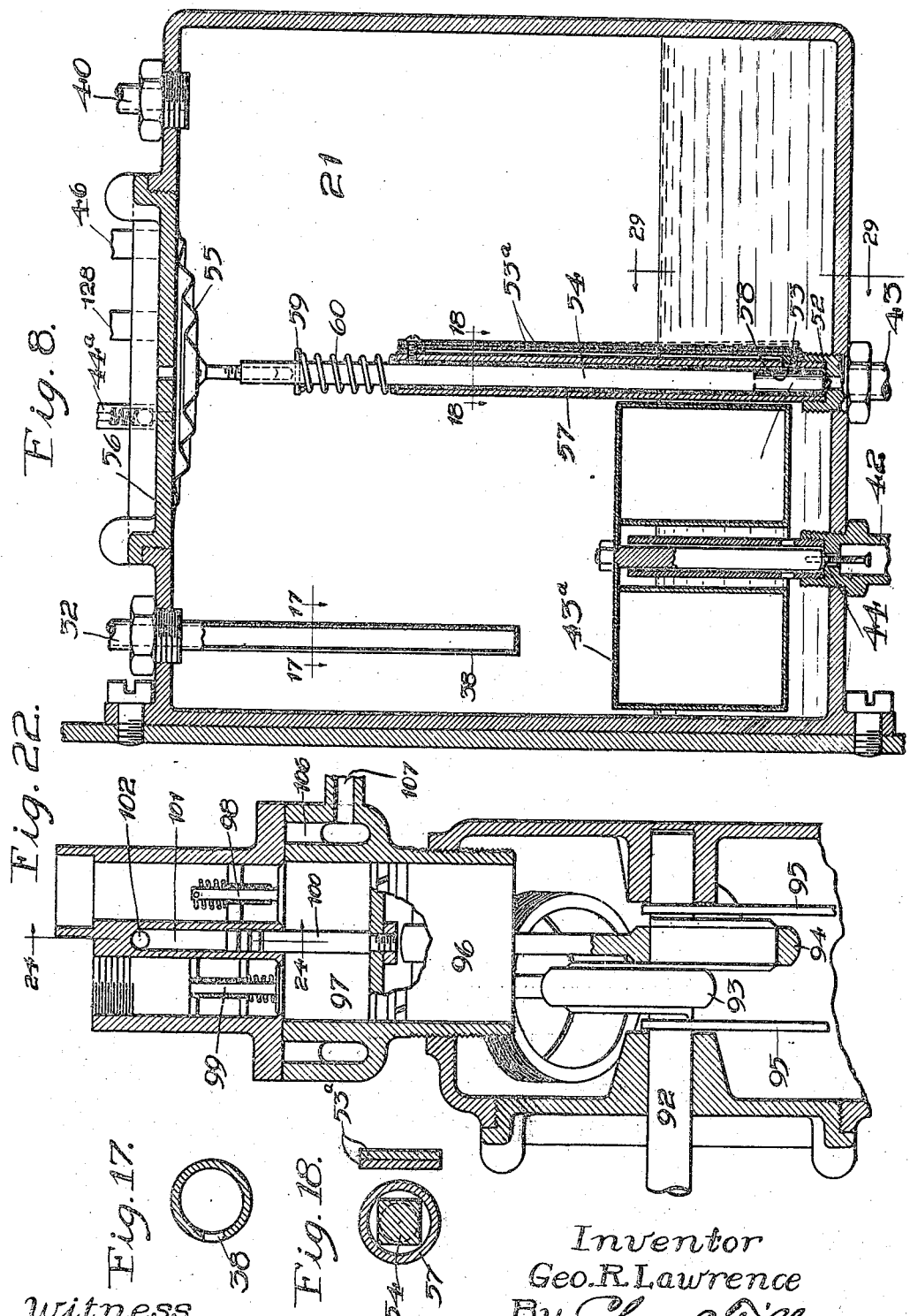

Feb. 20, 1923.
G. R. LAWRENCE.
HYDROCARBON CONSUMING HEATING APPARATUS.
FILED MAR. 29, 1920.

Witness
Geo. L. Lawrence

Inventor
Geo. R. Lawrence
By Chas. C. Tillman
Atty.

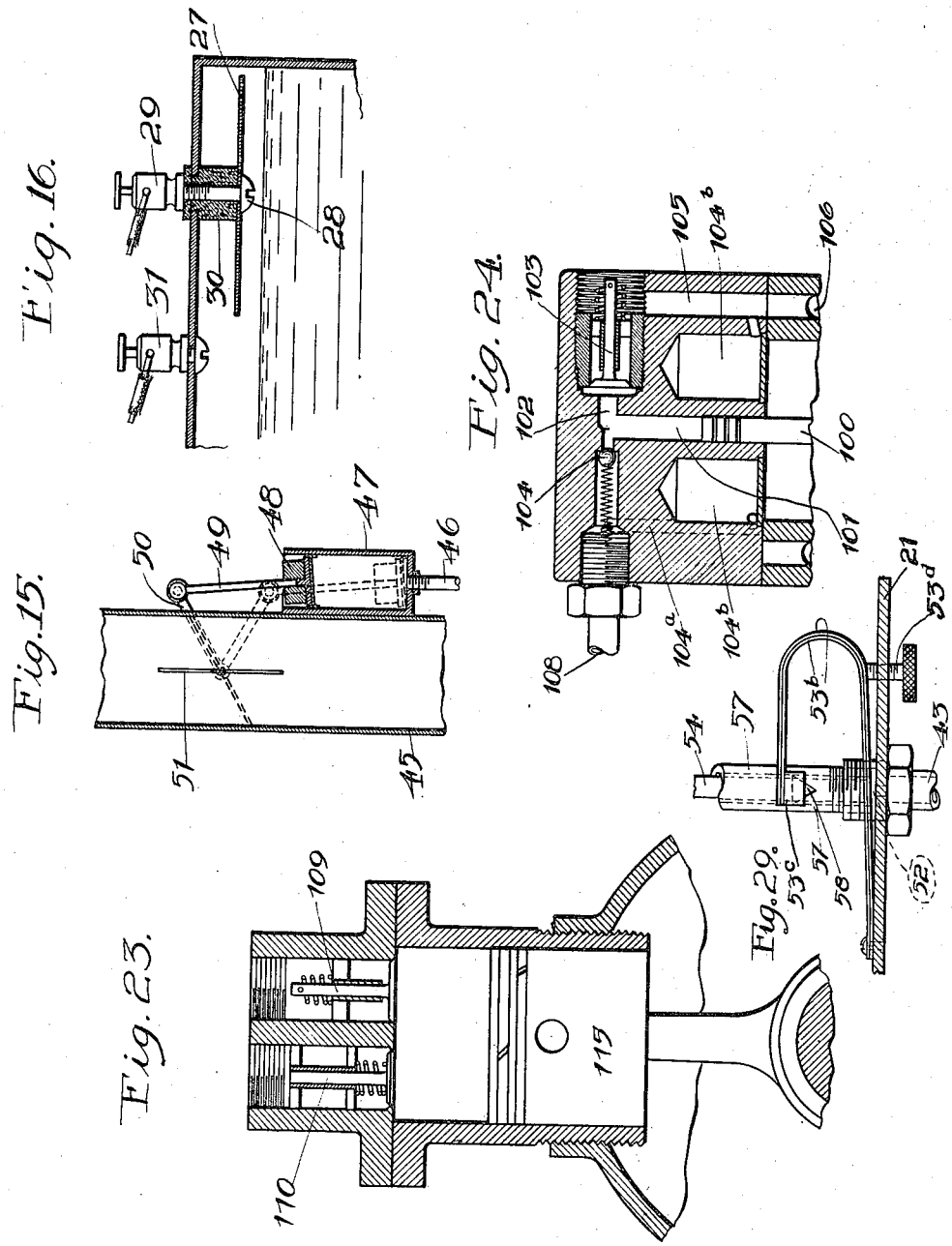

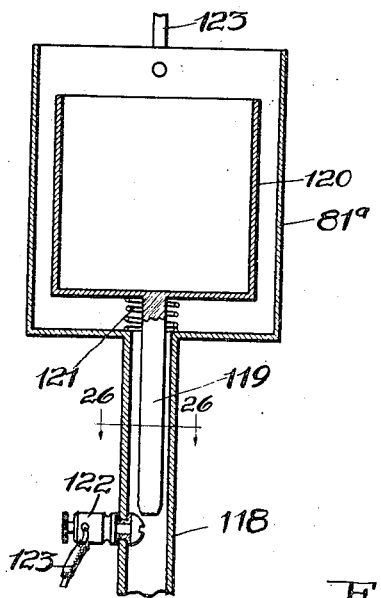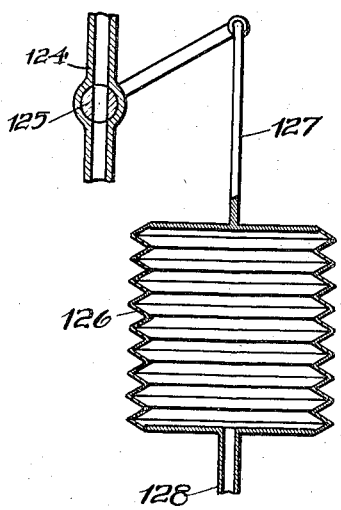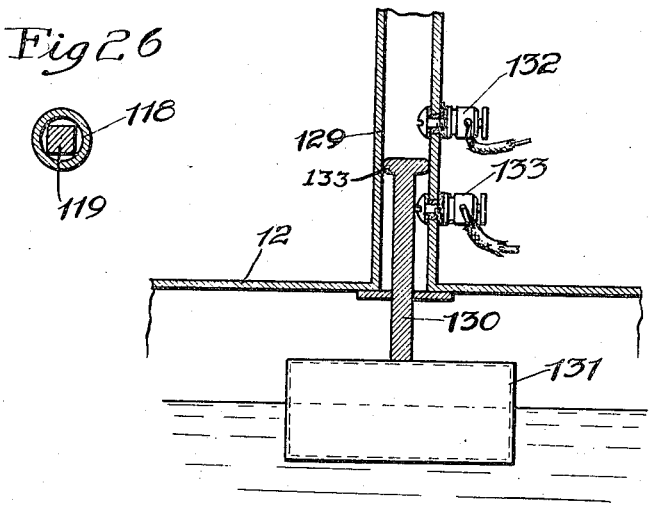

Patented Feb. 20, 1923.

1,445,965

UNITED STATES PATENT OFFICE.

GEORGE R. LAWRENCE, OF CHICAGO, ILLINOIS, ASSIGNOR TO COMMONWEALTH ENGINEERING COMPANY, OF CHICAGO, ILLINOIS, A CORPORATION OF ILLINOIS.

HYDROCARBON-CONSUMING HEATING APPARATUS.

Application filed March 29, 1920. Serial No. 369,692.

*To all whom it may concern:*

Be it known that I, GEORGE R. LAWRENCE, a citizen of the United States, residing at Chicago, in the county of Cook and State of Illinois, have invented certain new and useful Improvements in a Hydrocarbon-Consuming Heating Apparatus, of which the following is a specification.

This invention relates to improvements in a hydro-carbon consuming heating apparatus, and particularly to that type of such apparatus designed for use in connection with furnaces or boilers to provide the heating medium for homes, apartments, factories, etc., or for the creation of steam for power purposes.

The invention has among its various objects the production of a construction whereby any low grade oil of the proper qualities may have the proper quantity of air mixed therewith to provide a mixture which may be economically produced and consumed.

It is one of the prime objects of the invention to provide a construction which will at all times maintain the proper relation between the air and fuel so that a proper combustible mixture will result, regardless of the variations in pressure, temperature or atmospheric conditions.

The invention further comtemplates the utilization of certain automatic regulating devices and signals whereby notice may be had should the device fail at any time to properly function. The invention has these and other objects all of which will be more clearly understood when read in conjunction with the accompanying drawings, in which various forms of the invention are illustrated, any one of which may be employed depending upon the capacity required or other desires of the user.

In the drawings—

Fig. 1 is a general view showing the various elements and their positions relative to each other when combined with an ordinary furnace.

Figs. 2 and 3 are respectively front and side elevations of an element shown in Fig. 1.

Figs. 4 to 7 are side and front elevations of modified forms of structures similar to the elements shown in Figs. 2 and 3.

Fig. 8 is a central section of one of the reservoirs utilized in connection with the devices shown in Figs. 2 to 7.

Figs. 10 to 12 are plan, side and sectional views respectively of a flame or heat distributing device which may be utilized in connection with the nozzle shown in Fig. 9.

Figs. 14 and 15 are details of a damper construction.

Fig. 16 is a fragmentary section of one of the reservoirs showing a construction whereby contact may be made to complete an electrical circuit to operate an alarm.

Figs. 17 and 18 are sectional views taken on lines 17 and 18 respectively of Fig. 8.

Fig. 19 is a fragmentary view of a thermostatically controlled valve provided in one of the reservoirs shown in Figs. 2 and 3.

Figs. 20 and 21 show details of construction employed in the device.

Fig. 22 is a sectional view taken on line 22—22 of Fig. 5.

Fig. 23 is a sectional view showing a valve arrangement utilized in connection with the structure shown in Fig. 22.

Fig. 24 is a sectional view taken on line 24—24 of Fig. 22.

Figure 13:
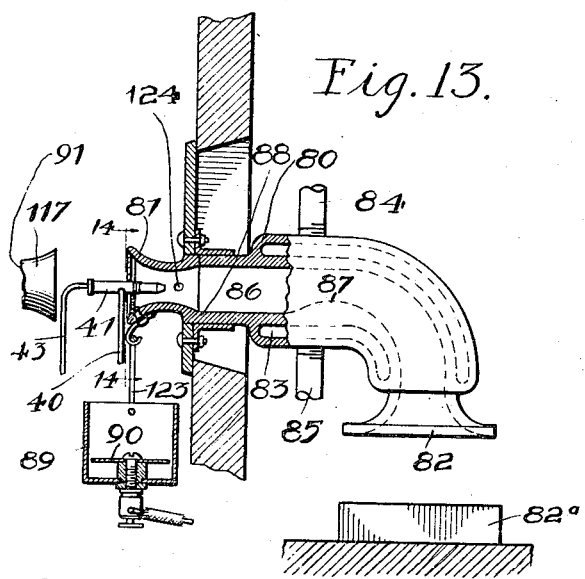
Fig. 13 illustrates a device which may be employed in connection with a hot air furnace, whereby hot water may be supplied, and the apparatus stopped and an alarm given in event of the failure of the proper operation of certain parts of the apparatus.

Fig. 25 is a vertical sectional view of a modified form of the alarm giving and apparatus stopping device shown in Fig. 13.

Fig. 26 is a plan sectional view taken on line 26—26 of Fig. 25.

Fig. 27 is a similar view to Fig. 25, of a pilot light regulating mechanism which can be installed at any suitable point in the apparatus.

Fig. 28 is a vertical sectional view of a modified form of a construction whereby contact may be made to complete an electric circuit to operate an alarm, and Fig. 29 is a view partly in section and partly in elevation of a portion of the controlling reservoir and a part of a modified construction of the thermostatically controlled valve provided in said reservoir.

In practice a large tank or vat, not shown, containing sufficient fuel or liquid for use for a considerable length of time, is imbedded in the ground or otherwise suitably located at a distance from the apparatus, and from this reserve tank or vat, the liquid or fuel is pumped or otherwise conveyed to a storage reservoir 10, (see Fig. 1) located near the apparatus, or directly to an auxiliary reservoir 12. A feed pipe 11 extends from the reservoir 10 to the auxiliary fuel tank 12, which it will be noted is preferably arranged below the lowermost line of the reservoir 10, thus the fuel will at all times flow from this main reservoir to the auxiliary reservoir 12. The inlet 12$^a$ to this auxiliary reservoir is regulated by a float controlled valve 13 shown in Fig. 21, the float being designated by the numeral 14 in Fig. 2. A large screen 15 is arranged in the lowermost portion of the reservoir 12 over the bottom thereof, and acts to strain the fuel as it passes therethrough into the reservoir. This screen is located preferably, above the inlet or valve 13, and preferably inclined as shown, in order that the screenings or sediment removed from the fuel by it, may be deposited on the floor of the reservoir 12 instead of being retained by the screen and thus clogging the same. This reservoir is further provided with what may be termed a breather pipe 16 which causes atmospheric pressure to exist in the reservoir 12, and prevent overflow. This reservoir 12 is mounted upon and carried by a framework generally designated by the numeral 17 which also carries a motor 18, pump and compressor 19, fan 20, reservoir 21, and a cabinet 22 in which is confined a relay, transformer and electric switch (not shown).

The fan, motor, pump and compressor are arranged upon and supported by a platform 23. The reservoir 21 and the cabinet 22 are supported upon the vertical supporting wall 24. Thus it is readily apparent that a unitary construction is provided which may be placed at any desired position relative to the furnace. The compressor, motor and fan are all mounted and driven from the motor shaft, all of the bearings of this shaft are lubricated by oil contained in the reservoir 25 which has tubular passages 26 extending therefrom in which are retained suitable lubricant conveying mediums such as rings or wicks, which by capilary attraction constantly supply said bearings with oil from said reservoir.

The auxiliary reservoir 12 is provided with the contact making elements shown in Fig. 16, which consists of a metallic plate 27 which is suspended fom the uppermost wall of this reservoir by a screw 28 and the binding post 29, it being insulated from the wall by the insulation 30. This wall of the reservoir is provided with an additional binding post 31. These posts are in electrical connection with a signal or alarm, (not shown) which is operated when the oil in this reservoir reaches the plate and completes the circuit between this plate and the posts, the latter of which forms part of the grounded side of the circuit. The auxiliary reservoir 12 has a pipe or passage 32 leading from it to the pump and compressor 19 and the reservoir 21. Through this pipe or passage both air and oil is forced into the reservoir 21. The lowermost end of this passage is provided with a smaller tube 33, the uppermost end of which latter tube is secured in the end of the pipe 32 which has the perforations 34 through which air is permitted to pass. The lowermost end of this tube 33 is closed and is provided with a triangular opening 35, which together with the portion 36 provides a valve to govern the amount of fuel which passes through this opening. The portion 36, is thermostatically operated by the elements 37, the same being two pieces or strips of metal of different kinds or expansive qualities, lying one on the other, and fastened together throughout their lengths, and at one end to the tube 33 as shown in Fig. 19, of the drawings. The portion or valve 36 is carried by the lower portion of the elements 37 and it is evident that as they are flexed by the changes in temperature said valve will be caused to move so as to increase or diminish the size of the port or opening 35 and thus regulate the passage of fluid therethrough.

The arrangement just described is constructed so as to allow a predetermined amount of oil or fuel to pass therethrough when at a comparatively heavy consistency due to a low temperature, and to allow the same amount to pass therethrough by reducing the degree of the opening 35, as the fuel rises in temperature. Thus it is evident that an automatic arrangement is provided for retaining a uniform amount of oil which passes into the reservoir 21, regardless of the temperature changes. The uppermost end of this passage 32 terminates in the reservoir 21, it being provided with the elongated opening 38, see Figs. 8 and 17, through which the fuel and air may pass into the reservoir 21, in the form of mist, preferably, against the adjacent wall of the reservoir to cause condensation. This reservoir 21 is provided with a post to which is connected a passage 40 the latter forming an air passage to the nozzle generally designated 41, this nozzle being arranged in the fire place or combustion chamber of the furnace. In addition, this reservoir has a passage 43 which also leads to the nozzle 41 to feed fuel and air thereto, and has another passage 42 which leads back to the reservoir 12. This last named passage is controlled by a float operated valve 44, the valve being closed when a proper amount of fuel is contained in the reservoir 21 and opened when the float 43$^a$ is lifted to permit the escape of that fuel which is in excess of the prescribed amount. Located in the upper portion of the reservoir 21, is a blow-off cock 44ª by means of which excess pressure may be discharged.

The passage 43 is provided with means whereby air and fuel in predetermined quantities, are permitted to pass therethrough, the fuel being located in a volume in the bottom of the reservoir, will of course, have in addition to the air pressure, the specific gravity of the column or volume, above the opening 58, in said passage, consequently, the fuel or liquid overbalances the air and uniform flow regardless of the air pressure is maintained. The fuel remains the same at all times. By varying the air pressure more or less air can pass, and the amount of air can be varied by means of the sleeve 66, (see Fig. 9) by enlarging or reducing the opening 72 of the atomizing nozzle 41, or by increasing or decreasing the pressure in the reservoir 21 by the pumps and blow-off valve 44ª, in said reservoir. To this end, a pressure regulated valve 52 and a valve 53, controlled by thermostatic elements 53ª similar to the elements 37 above described, is utilized, the said valve regulating the amount of fuel passing therethrough and in turn being controlled by the temperature of the fuel contained in the reservoir.

The valve 52 is formed by providing the lowermost end of the rod 54 with a surface which forms one part of the valve 52 the uppermost end of this rod being loosely in contact with a diaphragm 55 which is secured to the closure 56, which is removable to permit of access to the interior of the reservoir. This rod is angular in cross section and is arranged within the round tube 57 which is securely fastened at its lowermost end. By this arrangement it is obvious that air can pass between said rod and tube. One wall of this tube is provided with an aperture 58, the size of which is enlarged or diminished by the thermostatically controlled valve 53. This rod is preferably cylindrical at its lower portion to prevent restriction of the opening 58 in said tube by the angular portion of said rod. To this end a pin 59 is passed through the rod and a coiled spring 60 is arranged upon the rod between the pin and the uppermost end of the tube 57, to raise the rod when diaphragm lifts.

From the foregoing explanation of the valve controlled passage 42, the controlled passage 43 and the construction co-operating therewith it is evident that should an excess amount of fuel be pumped into the reservoir 21 by the pump 19 that the float 43ª connected to the valve 44 will rise and permit the excess to escape through the passage 42 into the reservoir 12. It is preferred to always pump or maintain an amount of oil in the reservoir in excess of that required, without the necessity of accurately metering the amount of fuel pumped, so that a constant level will be maintained by the controlling float 43ª. It is also evident that a structure is provided for regulating the flow of fuel through the passage 43, and that this flow is determined by the gravity of the column, temperature and density of said fuel, consequently the escape of the fuel remains constant regardless of air pressure, temperature or density of the fuel.

Figure 9:
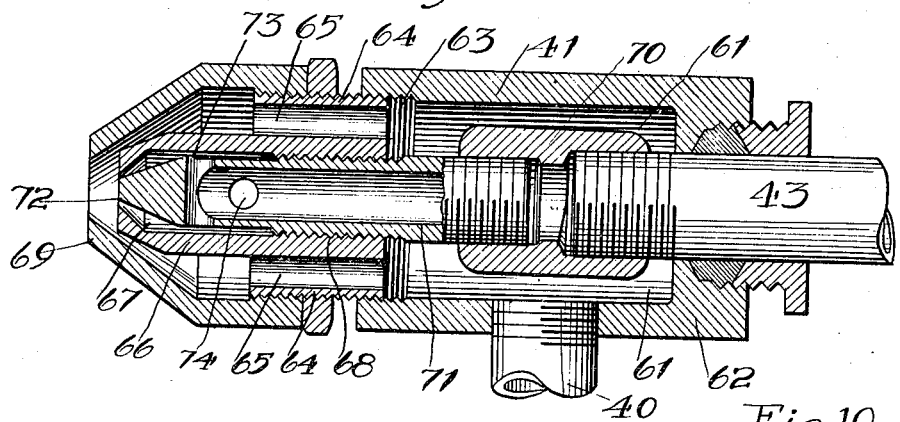
Fig. 9 is a central longitudinal section of an atomizing nozzle utilized in the structure shown in Fig. 1.

By referring to Fig. 9 the construction of a nozzle which is applicable for use in the system is illustrated, and as before stated, this nozzle is connected to the air passage 40 leading therefrom.

Means for regulating a damper 51 in the smoke stack 45 which damper is opened or partly opened by air pressure from the reservoir 21 through a pipe 46 leading therefrom to a chamber 47, arranged adjacent to the smoke stack 45, see Fig. 15, at slightly lower pressure, and just before the valve 52 is released by the diaphragm 55, thus affording the necessary draught before the fire is started and also closing again immediately after the fire quits, actuated by diminishing air pressure in reservoir 21, thus preventing the heat contained in the furnace walls, etc., from passing out through the smoke pipe and being wasted.

This chamber contains a weighted piston element 48 having the elements 49 and 50 connected thereto and to the damper 51 arranged in the smoke stack.

The weight being moved upwardly by the pressure and lowered by gravity, its movement in either direction operates the damper and controls the draft through the chimney.

Referring now particularly to the construction of the nozzle as shown in Fig. 9 it will be seen that both pipes or passages 40 and 43 terminate in a chambered body or connection therewith. The air passage 40 leads to a chamber 61 provided in the member 62 and the passage 43 is mounted in one wall thereof and enters transversely to the passage 40. The forward end of the member 62 is threaded as shown at 63 for the reception of the threaded sleeve or member 64 which is provided with a plurality of passages 65 and has the forwardly chambered portion 66 extending therefrom, the most forward inner and outer end of which is cone shaped as indicated at 67. The rearward portion of the member 64 is internally threaded as shown at 68 for the reception of the forward extremity or termination of the portion or passage 43. Upon the member 64 is arranged a tapered nozzle 69 which may be adjusted upon the portion 64 with relation to the end 67 of said member. The passage 43 is arranged so that it extends axially through the chambered element 62 it being provided with the union 70 which connects it with the forwardly extended tubular portion 71 which is in turn threaded into the threaded portion 68 of the element 64. The most forward end of this element 71 terminates in a conical shaped head or end 72 which is arranged in the chambered portion 66 and also is provided with the apertures 73 and 74 which are positioned transversely to each other, and are so located with respect to the end of the element 71 that they also are arranged in the chambered portion 66.

The construction of the ends of the elements 69, 71 and 72 are such that both the air and fuel as it is discharged therefrom is thoroughly atomized and properly mixed, resulting in a mixture the elements of which will be completely consumed when ignited, and also will be ejected therefrom at the desired pressure. The fuel or mixture discharged through the space between the head 72 and the contracted part 67 of the member 64 will be atomized by such passage and owing to the passage of air through the narrow space between the elements 67 and 69 at a greater speed or pressure and by reason of the intersecting action of the two volumes of fluids a most thorough mixture will be produced.

Figures 10, 11, 12, 14:
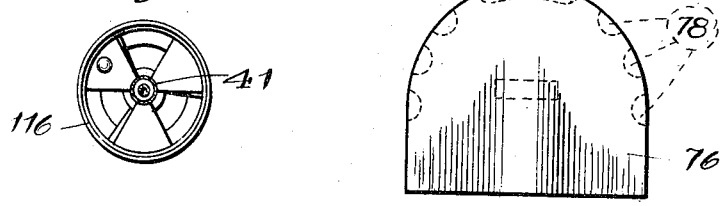

In Figs. 10 to 12 are illustrated a construction which may be arranged to co-operate with the nozzle shown in Fig. 9 to spread the heat and flame, throughout a greater area.

This construction consists of a pair of separated plates 76 and 77 which are spaced apart by the separated radially arranged elements 78 which are arranged at the forward portion of said plates. The rearward portion of one of the plates is formed to produce a mouth 79 into which the forward end of the nozzle discharges, and as the elements discharged therefrom are intercepted by the elements 78 they are caused to be radially emitted from this construction, which spreads the heat and flames over a greater area in the furnace.

In Fig. 13 another arrangement is shown which may be utilized in connection with the nozzle shown in Fig. 9 and which provides a water jacket in and from which water may be retained and heated and distributed to various portions of the premises.

This construction consists of the hollow body or casting 80 having the flared end 81, the downwardly facing flared portion 82, located above a heat retaining member 82ª and the water jacket 83, to and from which the pipes 84 and 85 lead. The lowermost face of the passage 86 is provided with a raised portion 87, this and the inner face of the lowermost portion of the flared portion 81 form a pocket 88 in which the heavier portions of the oil which does not reach the exit 82 may lodge and be retained.

It will be noted that the portion 87 is somewhat higher than the raised portion of the flare 81 and consequently when the amount of oil deposited in this pocket becomes more than the pocket will hold, it flows out into the bucket 89 which is provided with the contact plate 90 and as the oil rises and reaches this plate the oil forms a conductor and completes the circuit and sets off the alarm which is also suitably connected with a similar construction shown in Fig. 16, and also stops the entire apparatus and prevents flooding in case the pilot light fails to function.

From the foregoing it is evident that the fuel and air is delivered to the reservoir 21 and to the nozzle 41. In addition, an auxiliary means is provided for delivering air to this nozzle, this means includes the fan 20 and the passage 91, and will be hereinafter described.

In Figs. 4, 5, 6, 7, 22, 23, and 24 are shown modified pump constructions and connections therefrom. Fig. 23 being a sectional view of the structure of the arrangement shown in Figs. 6 and 7 and Fig. 22 is a sectional view of the construction illustrated in Figs. 4 and 5.

The remaining mechanism shown in these Figures 4 to 7 that is the fan and motor, may be identical with that described in connection with Figs. 2 and 3, and consequently will not be gone into in connection with the structures above referred to.

In Figs. 4, 5, 22, and 24 is shown a pump for pumping both air and fuel to the receptacle 21ª. The shaft 92 is provided with a pair of eccentrics 93 and 94 and the oil rings 95, which eccentrics actuate the pistons 96 arranged in the chamber 97. The uppermost wall of this chamber is provided with the air intake valve 98 and the outlet valve 99, the former being opened upon the down stroke of the piston, its suction draws into the piston chamber which is exhausted therefrom upon the up stroke thereof. This piston 96 is provided with an auxiliary piston 100 which operates in the chamber 101 which terminates at its uppermost end in a connection with a passage 102 one end of which is controlled by an intake valve 103 and the other by a check valve 104. This passage 102 is connected with a passage 105 which in turn connects with an oil chamber 106 and has a pipe 107 leading therefrom to the source of supply.

The chambers containing the valves 103 and 104 are each connected with an air chamber 104ᵇ. The chamber for the valve 103 is connected therewith through the passage 105 and the chamber for the valve 104 by the passage 104ª. These chambers and connections are provided so as to break any vacuum which might exist in the valve chambers and permit their operation.

The chamber in which the valves 99 are confined and the chamber containing the ball check valve 104 are all connected with the reservoir 21$^a$ by the passage 108. Thus as the pump is operated both air and fuel will be forced into the reservoir 21$^a$ and consequently the fuel contained in this reservoir will be ejected from the atomizing nozzle under pressure.

In the structure shown in Figs. 6, 7 and 23 another modified structure of pump is shown, in which each cylinder is provided with a valve controlled intake and exhaust port, 109, and 110 respectively, the intake ports being connected together by the passage 111 which has a tubular extension 112 equivalent to the pipe 32, see Fig. 20, through which both air and fuel are passed.

The other valves are also connected together by the passage 113 which has a passage 114 leading therefrom to the reservoir 21$^b$. In this later construction both air and fuel are taken in by the valve 109 and expelled by the opening of the valve 110 upon the operation of the piston 115.

It is apparent that the capacity of the apparatus may be changed to suit the requirements thereof by using one or more of the pumps of the modified constructions shown in Figs. 4 to 7 inclusive and in Figs. 22, 23 and 24.

The auxiliary means above referred to for delivering air to the nozzle 41, comprises the fan 20 or blower, the pipe 91 leading from the blower casing to a suitable point adjacent the damper 116 surrounding the nozzle 41, and equipped with a flared portion 117 to direct the discharged air through said damper.

In Fig. 25 is shown a modification in the alarm and apparatus stopping device shown in Fig. 13, which consists of a receptacle 81$^a$ having a tube 118 leading from its bottom in which is freely located a rod 119 extended from a bucket 120 positioned in the receptacle 81$^a$ but preferably spaced therefrom. Surrounding the rod 119 and resting on the upper end of the tube 118 is a spring 121 which supports the said bucket. Mounted on the tube 118 and insulated therefrom is a binding post 122 having a conductor 123 leading therefrom to an alarm, and cut out not shown. The receptacle 120 may have a bail 123 like the bucket 89 in Fig. 13 for suspending it from the distributor 80 as shown in said figure. A pilot light 124 is usually located in front of the nozzle 41 and kept constantly burning so as to assure ignition of the mixture from the nozzle.

In the event of the accidental extinguishment of said light, and the discharge of fuel from the nozzle into the distributor, it is apparent that as soon as sufficient oil is thereby collected in the pocket 88 to overflow the same, it will pass from the pocket into the bucket 120 and by its gravity overcome the tension of the spring and cause contact between the rod 119 and post 122 thus completing the electric circuit and giving an alarm.

In Figure 27 is shown a device for regulating the flow of fluid or fuel through the pilot light fixture 124 to economize therein, which consists of a shut-off valve 125 located in said fixture, an arm extended therefrom for turning the same and a bellows 126 connected by a rod 127 to said arm. The bellows is connected by a pipe 128 to the reservoir 21 and will be inflated and deflated by the pressure in said reservoir in such a way as to regulate the flow of fuel through the pilot light fixture without turning the light out, but so that it will consume but little fuel when the apparatus is at rest, for it will be understood that it operates intermittently as well as automatically.

In Fig. 28 is shown a modification of the construction illustrated in Fig. 16, which consists in providing the top of the reservoir 12 with a tube 129 in which is movably located a stem 130 extended upwardly from a float 131 supported by the fuel in said reservoir. The tube 129 is provided with binding posts 132 and 133, the former being electrically connected to the motor and the latter to an alarm or signal (not shown). The stem 130 is provided with a head 134 which in case of an excess amount of fuel in the reservoir 12 will rise and contact with the post 132 and thus stop the apparatus. In case of the fuel falling below the required amount in said reservoir the stem and the head will be lowered and the latter will contact with the post 133 and thus cause an alarm to be given.

From the foregoing description it is obvious that both air and fuel are discharged into the reservoir 21 and by virtue of the internal construction of this reservoir, both the amount and the pressure at which the fuel is expelled from the nozzle is automatically regulated and controlled, regardless of temperature or atmospheric conditions. It is further evident that added air may be supplied to the burner should this at any time be found desirable and also that the user will be warned should the system accidentally need attention.

It is further evident that the products of combustion are thoroughly atomized resulting in the complete consumption thereof which results in economical operation, for it will be understood that as the atomized or burning column extending from the nozzle or burner tip preferably has the secondary air forced or cutting through said column to the center of the same thereby supplying throughout the burning mass sufficient or nearly sufficient oxygen to cause complete combustion, thus not depending on a blast of air around or outside of the column and thus eliminating the roaring noise and heat and efficiency losses due to a larger amount of cold air than is required or consumed in combustion.

The invention as herein set forth is described as being intended for use in controlling the quantities of material or fluids and the pressure of air in the desired quantity for the purpose of mixing and supplying the same in a state or condition of high combustibility for heating purposes, but it will be understood that the apparatus is applicable for use in atomizing and applying various liquid substances, such as disinfectants, insecticides, varnishes, paints, fireproofing material and the like. In the event of its use for the last named purposes, as well as when limpid, light or high grade oil is used, it will be understood that the thermostatic regulators are not essential and may be omitted.

I desire it to be understood that, the words "fuel" and "oil" employed in the specification and claims are used to mean and shall be so construed, any fluid or mixture that may be applicable for use in the apparatus.

While I have herein shown various embodiments of the invention it is obvious that others and many changes in the details of construction may be resorted to without departing from the spirit of the invention as expressed in the appended claims.

In Fig. 29 is illustrated a modified form of the thermostatically controlled valve in the fuel and air outlet of the controlling reservoir 21, which consists in the employment of the thermostatically operated elements 53$^b$ which are substantially U-shaped and fastened together throughout their lengths and at one end to a support, such as the bottom of the reservoir 21. Mounted on the other ends of the members 53$^b$ is a valve 53$^c$ which is located against the wall of the tube 57, which has an opening 58 with which the valve 53$^c$ co-operates to increase or diminish its size to regulate the passage of fluid therethrough. The support 21 is provided with a screw 53$^d$ by means of which the members 53$^b$ and the valve 53$^c$ which they carry can be moved in such a way as to increase or diminish the size of the opening 58 as is apparent.

From the foregoing and by reference to the drawings it will be readily understood and clearly seen that the reservoir 21 and its modified forms constitute a controlling reservoir or unit for the operation of the apparatus.

Having thus fully described my invention, what I claim as new and desire to secure by Letters Patent is—

1. In a device of the character described, the combination of a source of fuel supply, with a reservoir connected to said source, means for delivering air and fuel under pressure to said reservoir, and means for automatically regulating the flow of air from said reservoir, said means being operable by the pressure in said reservoir.

2. In a device of the character described, the combination of a source of fuel supply, with a reservoir connected therewith, means for delivering air and fuel to said reservoir, and means for automatically regulating the flow of air from said reservoir, said means being operable by the pressure in said reservoir.

3. In a device of the character described, the combination of a source of fuel supply, with a reservoir connected therewith, means for delivering air and fuel to said reservoir, means for regulating the flow of fuel from the reservoir, said means being controlled by the temperature of the fuel and the pressure in the reservoir.

4. In a device of the character described, the combination of a source of fuel supply, a reservoir connected therewith, means for delivering air and fuel to said reservoir, means for regulating the flow of air and fuel from said reservoir, said means being controlled by the pressure in said reservoir and the temperature of the fuel in said reservoir.

5. In a device of the character described, the combination of a source of fuel supply, a reservoir connected therewith, means for delivering air and fuel under pressure to said reservoir, means for regulating the flow of air and fuel from said reservoir, said means being controlled by the pressure in said reservoir and the temperature of the fuel in said reservoir.

6. In a device of the character described, the combination of a source of fuel supply, a reservoir and a nozzle connected with the reservoir, a single passage for delivering air and fuel under pressure from the reservoir and a valve operable by the pressure in said reservoir and the temperature of the fuel therein, said valve controlling the flow of air and fuel through said passage.

7. In a device of the class described, the combination of a source of fuel supply, a reservoir, means for delivering air and fuel under pressure from the reservoir and means for automatically regulating the flow of said air and fuel from the reservoir, said means including a valve operable to permit the escape of the air and fuel from the reservoir, and a nozzle to which said air and fuel is fed.

8. In a device of the character described, the combination of a source of fuel supply, a reservoir, means for delivering air and fuel under pressure from the reservoir, and means for automatically regulating said air pressure, said means including a valve operable to permit the escape of the air and fuel from the reservoir, and a nozzle to which said air and fuel is fed.

9. In a device of the character described, the combination of a source of fuel supply, a reservoir connected with the source of supply, means for delivering air and fuel under pressure from the reservoir, and means for automatically regulating the flow of fuel from said reservoir, said means including a valve operable to permit the escape of the air and fuel from the reservoir, and a nozzle to which said air and fuel is fed.

10. In a device of the character described, the combination of a source of fuel supply, a reservoir connected with the source of supply, means for delivering air and fuel under pressure to the reservoir, and means for automatically regulating the flow of air and fuel from said reservoir.

11. In a device of the character described, the combination of a source of fuel supply, a reservoir and a nozzle connected with the reservoir, and means for delivering fuel from said source of supply to said reservoir and a single passage leading from the reservoir to said nozzle to deliver air and fuel under pressure to said nozzle.

12. In a device of the character described, the combination of a source of fuel supply, a reservoir and a nozzle connected with the reservoir, and a single passage for delivering air and fuel from the reservoir to said nozzle and means arranged within the reservoir for automatically regulating the flow of fluid therefrom.

13. In a device of the character described, the combination of a source of fuel supply, a reservoir and a nozzle connected with the reservoir, and means for delivering air and fuel from the reservoir to said nozzle and means for regulating the amount of fuel and air which is delivered to said nozzle, said means including means arranged within the reservoir for automatically regulating the amount of fuel in said reservoir, said means including a passage which leads back to the source of fuel supply.

14. In a device of the character described, the combination of a source of fuel supply, a reservoir and a nozzle connected with the reservoir, and means for delivering air and fuel to said reservoir and from the reservoir to said nozzle and means for automatically regulating the amount of air and fuel delivered to said nozzle, said means being arranged within said reservoir.

15. In a device of the class described, the combination of a source of fuel supply, a reservoir connected therewith, means for delivering air and fuel to the reservoir, means for regulating the flow of air and fuel from the reservoir, said means being controlled by the pressure in the reservoir and the temperature of the fuel in said reservoir, a nozzle connected with the reservoir through which the air and fuel are discharged from the reservoir, and auxiliary means for delivering air in proximity to the nozzle.

16. In a device of the character described, the combination of a source of fuel supply, a reservoir connected therewith, means for delivering air and fuel to the reservoir, means for regulating the flow of air and fuel from the reservoir, said means being controlled by the pressure in the reservoir and the temperature of the fuel therein, and means for regulating the amount of fuel contained in said reservoir.

17. In a device of the class described, the combination of a fuel supply, a reservoir connected therewith, a second reservoir, means for delivering air and fuel from the first mentioned reservoir to the second mentioned reservoir, means for delivering air and fuel from the second mentioned reservoir, and a nozzle connected therewith.

18. In a device of the class described, the combination of a fuel supply, a reservoir connected therewith, a second reservoir arranged above the first mentioned reservoir, means for pumping fuel and air from the first to the second mentioned reservoir, and means for delivering air and fuel from the second mentioned reservoir.

19. In a device of the character described, the combination of a fuel supply, a reservoir connected therewith, a second reservoir arranged adjacent the first mentioned reservoir, means for pumping fuel and air from the first mentioned reservoir, to the second mentioned reservoir, means for delivering air and fuel from the second mentioned reservoir and automatic means for regulating the air and fuel as it leaves the second mentioned reservoir.

20. In a device of the character described, the combination of a fuel supply, a reservoir fed therefrom, a second reservoir arranged adjacent the first mentioned reservoir, means for causing air and fuel to be delivered to said second mentioned reservoir, means for controlling the amount of fuel contained in the second mentioned reservoir, means for causing the fuel in the second reservoir to flow back into the first mentioned reservoir, and signal operating means arranged in the first mentioned reservoir.

21. In a device of the character described, the combination of a fuel supply, a reservoir fed therefrom, a second reservoir arranged adjacent the first mentioned reservoir, means for causing air and fuel to be delivered from the first mentioned reservoir to said second mentioned reservoir, means for delivering air and fuel from said second mentioned reservoir, and means for regulating the flow of fuel from said reservoir, said means being controlled by the temperature of said fuel.

22. In a device of the character described, the combination with a fuel supply, a reservoir fed therefrom, a second reservoir arranged adjacent said first mentioned reservoir, means for delivering air and fuel from said first mentioned reservoir to said second mentioned reservoir, means for delivering air and fuel from said second mentioned reservoir to a burner, and means for controlling the relative flow of air and fuel from said reservoir by means of the pressure in said reservoir.

23. In a device of the class described, the combination of a reservoir, means for supplying fuel under pressure to said reservoir, a nozzle connected to said reservoir, a single passage for delivering fuel under pressure from the reservoir to said nozzle, the discharging portion of said nozzle being constructed to permit the passage of air and fuel and to mix the same as it is discharged therefrom.

24. In a device of the class described, the combination of a fuel nozzle, a tubular element into one end of which said nozzle discharges, said element having a flared flame distributing end portion, a water jacket and a recessed portion in which fuel may be retained, said recess being constructed to permit the escape of fuel from one end of the recessed portion, a container into which the fuel from said recess may flow, and signal operating means arranged in the container.

25. In a device of the class described, the combination of a fuel nozzle, a tubular element into one end of which said nozzle discharges, said element having a recessed portion between its ends in which fuel from the nozzle may lodge and being constructed to permit said fuel to escape from said recessed portion, and a container into which said fuel may flow from said recessed portion.

26. A device of the class described including in combination with a combustible mixture discharging nozzle, a flame and heat distributor consisting of a hollow member located to receive at one of its ends from said nozzle the heat and flames thereof, the lower surface of the cavity having therein a pocket, and an electrical circuit closing device co-acting with the overflow fuel from said pocket located adjacent thereto for the purpose of producing an alarm.

27. In a device of the class described, the combination of a reservoir in which air and fuel is contained, and means for regulating the flow of air and fuel from said reservoir, said means being arranged in said reservoir.

28. In a device of the class described, the combination of a reservoir in which air and fuel is contained, said reservoir having an outlet, a pressure operated valve for controlling the air and fuel passing through said outlet, said valve being adjustable to vary the amount of air and fuel passing through said outlet.

29. In a device of the class described, the combination of a reservoir in which air and oil is contained and having an outlet, a pressure operated valve for controlling the air passing through said outlet, another valve for controlling the amount of oil passing through said outlet, said first mentioned valve being adjustable to control the amount of air passing through said outlet.

30. In a device of the class described, the combination of a fuel nozzle, a tubular element into one end of which said nozzle discharges, said element having a downwardly facing outlet, a recess arranged between the ends of said element, into which fuel may be deposited, said recess being constructed to discharge said fuel from the end opposite to the downwardly facing portion, a container having signal operating means into which the fuel from said recess may flow, and said tubular element being provided with a water jacket.

31. In a device of the class described, the combination of a fuel nozzle, a hollow element into one end of which said nozzle discharges, said element having a flared flame distributing end portion, a water jacket and a recessed portion in which fuel may be retained, said recess being constructed to permit the escape of fuel from one end of the recessed portion, a container into which the fuel from said recess may flow, and signal operating and apparatus stopping means arranged in the container.

32. In a device of the class described, the combination with a reservoir constructed to retain air and fuel and having an outlet, of pressure regulating means for opening said outlet at a pre-determined degree of pressure, said means being operable to close the outlet when the pressure within the reservoir is reduced below the predetermined degree.

33. In a device of the class described, the combination with a reservoir constructed to retain air and fuel and having an outlet, of pressure actuated means for opening said outlet at a pre-determined degree of pressure, said means being operable to close said outlet when the pressure within the reservoir is reduced below the pre-determined degree, and means in said reservoir for regulating the quantity of fuel therein.

34. In a device of the class described, the combination with a reservoir constructed to retain air and fuel and having an outlet, of pressure actuated means for opening said outlet at a pre-determined degree of pressure, said means being operable to close said outlet when the pressure within the reservoir is reduced below the pre-determined degree, and means to regulate the pressure in the reservoir.

35. In a device of the class described, the combination with a reservoir constructed to retain air and fuel and having an outlet, of pressure actuated means for opening said outlet at a pre-determined degree of pressure, said means being operable to close said outlet when the pressure within the reservoir is reduced below the pre-determined degree, means in said reservoir for regulating the quantity of fuel therein, and means to regulate the pressure in the reservoir.

GEORGE R. LAWRENCE.